(12) United States Patent
Lange

(10) Patent No.: US 6,557,894 B2
(45) Date of Patent: May 6, 2003

(54) WATER ACTUATED SYSTEMS FOR TRAILERS

(76) Inventor: Graeme John Lange, P O Box 123, Loc 5209 Harper Street, Pingelly, Western Australia (AU), 6308

( * ) Notice: Subject to any disclaimer, the term of this patent is extended or adjusted under 35 U.S.C. 154(b) by 0 days.

(21) Appl. No.: 09/801,893

(22) Filed: Mar. 8, 2001

(65) Prior Publication Data

US 2001/0009329 A1 Jul. 26, 2001

(30) Foreign Application Priority Data

| May 24, 2000 | (AU) | ............................................ PQ 7742 |
| Oct. 30, 2000 | (NZ) | ................................................. 507816 |
| Nov. 2, 2000 | (AU) | ............................................ 69693/00 |

(51) Int. Cl.$^7$ ................................................. B60S 9/02
(52) U.S. Cl. ................................ 280/766.1; 280/DIG. 1
(58) Field of Search ........................... 280/763.1, 764.1, 280/765.1, 766.1, DIG. 1

(56) References Cited

U.S. PATENT DOCUMENTS

| 2,229,530 A | * | 1/1941 | South ........................ 280/763.1 |
| 3,582,106 A | * | 6/1971 | Keijzer ........................ 280/708 |
| 3,592,485 A | * | 7/1971 | Buhl .......................... 280/712 |
| 3,857,582 A | * | 12/1974 | Hartog ...................... 280/764.1 |
| 4,079,915 A | * | 3/1978 | Mountain ................ 254/93 HP |
| 4,318,550 A | * | 3/1982 | Jacobsen .................. 280/766.1 |
| 5,188,379 A | * | 2/1993 | Krause et al. .............. 280/6.12 |
| 6,176,458 B1 | * | 1/2001 | Stryke ......................... 248/351 |

FOREIGN PATENT DOCUMENTS

| AU | 200069963 | * | 5/2001 |
| GB | 2066188 | * | 7/1981 |
| JP | 5139267 | * | 6/1993 |
| WO | 94/16926 | * | 8/1994 |

* cited by examiner

*Primary Examiner*—Brian L. Johnson
*Assistant Examiner*—Bryan Fischmann
(74) *Attorney, Agent, or Firm*—Dougherty Clements & Hofer (57) ABSTRACT

A system for stabilizing a trailer such as a caravan, when parked, or for raising and lowering a pop-top or a television antenna on a caravan, the system having at least one four water actuated ram, and being operable from water supplied from a water tap 47 (faucet) at a camp ground/caravan park. A valve 19 in the supply line 33 prevents loss of water and hence inadvertent actuation/deactuation of the water actuated rams. A selector valve 21 allows selection between extend and retract operations. In the case of a system for stabilizing a trailer such as a caravan when parked, or for raising and lowering a pop-top on a caravan there are at least two water actuated rams and preferably four water actuated rams 11, 13, 15, 17 connected in parallel.

7 Claims, 10 Drawing Sheets

WATER ACTUATED SYSTEMS FOR TRAILERS

FIELD OF THE INVENTION

This invention relates to a system for stabilizing structures, and in particular, to a system for stabilizing caravans and motor homes.

BACKGROUND ART

Caravanning has long been a popular holidaying activity. A caravan is a vehicle in the form of a trailer which is towed by a motor vehicle such as a car or a four-wheel drive estate/station wagon. Caravans may be variously known as RV trailers (recreational vehicle trailers) and travel trailers in some countries. It will be understood that RV trailers and travel trailers fall within the scope of the term "caravan" as used in this specification. Modern caravans incorporate bedding, seating, and cooking facilities, and often also incorporate toilet and shower facilities. As such, they provide a home away from home for those who utilize them for vacations.

For ease of towing, in common with other trailers towed by cars, caravans typically have a single centrally mounted axle, or sometimes a multiple axle arrangement which is also centrally mounted, located to the rear of the balance point of the caravan, in order to provide greater stability for the towing vehicle.

To provide stability to the caravan, once parked and disconnected from the vehicle, it has been common practice for footings to be provided proximal to each corner of the caravan. These footings have commonly been supported on legs pivotally attached, usually to the chassis of the caravan, and moved from a raised position in which they are stowed, to a downward deployed position in which they perform a supporting function. The footing and legs are usually moved by a jacking mechanism, usually a screw jack mechanism similar to that employed in a scissor jack, between the raised position in which they are stowed, to a downward deployed position in which they perform a supporting function.

A caravan often referred to as a "pop-top" caravan has also become popular. This type of caravan has upper sides, usually of canvas or some other fabric, which then allows for the roof to be raised when the caravan is to be occupied, and lowered when the caravan is to be towed. This arrangement lowers the drag coefficient, reducing the fuel used in order to tow the caravan when being towed by a normal passenger car that has a low drag coefficient. A difficulty with this type of caravan is that the roof portion can be difficult to raise, particularly by retirees who do not have the strength of their youth, and who constitute a large proportion of caravan users.

It is an object in one embodiment of this invention to provide an alternative stabilizing arrangement for a caravan (or other type of trailer) when parked ready for use as accommodation.

It is an object in another embodiment of this invention to ameliorate the difficulties associated with raising and lowering the roof in a pop-top type caravan.

It is an object in yet a further embodiment of this invention to provide a system working on the same principle, that can be used to raise and lower an antenna, such as a television aerial.

It is a particular object of this invention to provide such an arrangement which is inexpensive to install, and may be readily used by a caravanner, with very little physical effort required.

DISCLOSURE OF THE INVENTION

In accordance with one aspect of the present invention there is provided a stabilizing system for a trailer when parked, the stabilizing system including at least two water actuated rams located in spaced relation near the periphery of the floor pan of the trailer and connected each at one end thereof, each said water actuated rams having a body containing a piston, the body having two communication ports for communicating flow of water to and/or from said body, said piston having sealing means to form a seal between said piston and said body, said sealing means being located between said ports to prevent free flow of water between said ports, each said water actuated ram being connected at the other end thereof by a leg to a footing for bearing against the ground; said water actuated rams being fluidly connected in parallel, and said stabilizing system having valve means associated with at least one of the ports of each of the water actuated rams.

Preferably said piston is connected by said leg to said footing for bearing against the ground.

In accordance with a second aspect of the present invention there is provided a raising and lowering system for a roof of a pop-top trailer when parked, the system including at least two water actuated rams located in spaced relation near the periphery of and connected at one end each the roof of the trailer, each said water actuated rams having a body containing a piston, the body having two communication ports for communicating flow of water to and/or from said body, said piston having sealing means to form a seal between said piston and said body, said sealing means being located between said ports to prevent free flow of water between said ports, each said water actuated ram being connected at the other end to the body or chassis of said pop-top trailer; said water actuated rams being fluidly connected in parallel, and said system having valve means associated with at least one of the ports of each of the water actuated rams.

Preferably said piston is connected by a leg to said roof.

In accordance with a third aspect of the present invention there is provided a raising and lowering system for an antenna on a trailer when parked, the system including a water actuated ram connected at one end thereof to said antenna, and mounted to the trailer at the other end thereof, said water actuated ram having a body containing a piston, the body having two communication ports for communicating flow of water to and/or from said body, said piston having sealing means to form a seal between said piston and said body, said sealing means being located between said ports to prevent free flow of water between said ports; said water actuated rams being fluidly connected in parallel, and said system having valve means associated with at least one of the ports of the water actuated ram.

Preferably said piston is connected by a leg to said antenna.

In accordance with any of the above aspects of the invention, preferably said body has two communication ports located one each at or near opposing ends thereof.

The stabilizing system, in operation, works by introduction of water into the upper ports of the water actuated rams forcing the pistons downward until the footings reach the ground. Thereafter, the valve means is closed, preventing loss of water and inadvertent retraction of any of the water actuated rams. Similarly the system when used in a pop-top trailer or when used to raise or lower a television antenna, works by introduction of water into one of the ports of the water actuated rams forcing the pistons outward, and thereby raising the roof relative to the rigid body of the trailer, or raising the television antenna, respectively.

Preferably said opposing ports comprise a first port and a second port, whereby on introduction of water in said first port, said leg is forced outward from said body, and on introduction of water in said second port, said leg is retracted toward said body.

Preferably said system includes four of said water actuated rams, one located near each corner of the floor plan of the trailer. A system with two rams could be anticipated where the trailer was left on its jockey wheel, once disconnected from the vehicle.

Preferably said system includes a water inlet communicating with first ports of said water actuated rams via said valve means.

Preferably there is also included between said water inlet and said first ports and said second ports, a selector valve, wherein said selector valve in a first position permits flow of water from said water inlet to said first port to force said legs outward, and in a second position permits flow of water from said water inlet to said second ports to retract said legs.

BRIEF DESCRIPTION OF THE DRAWINGS

Three preferred embodiments of the invention will now be described, in the following description made with reference to the drawings, in which.

BEST MODE(S) FOR CARRYING OUT THE INVENTION

Figure 10:
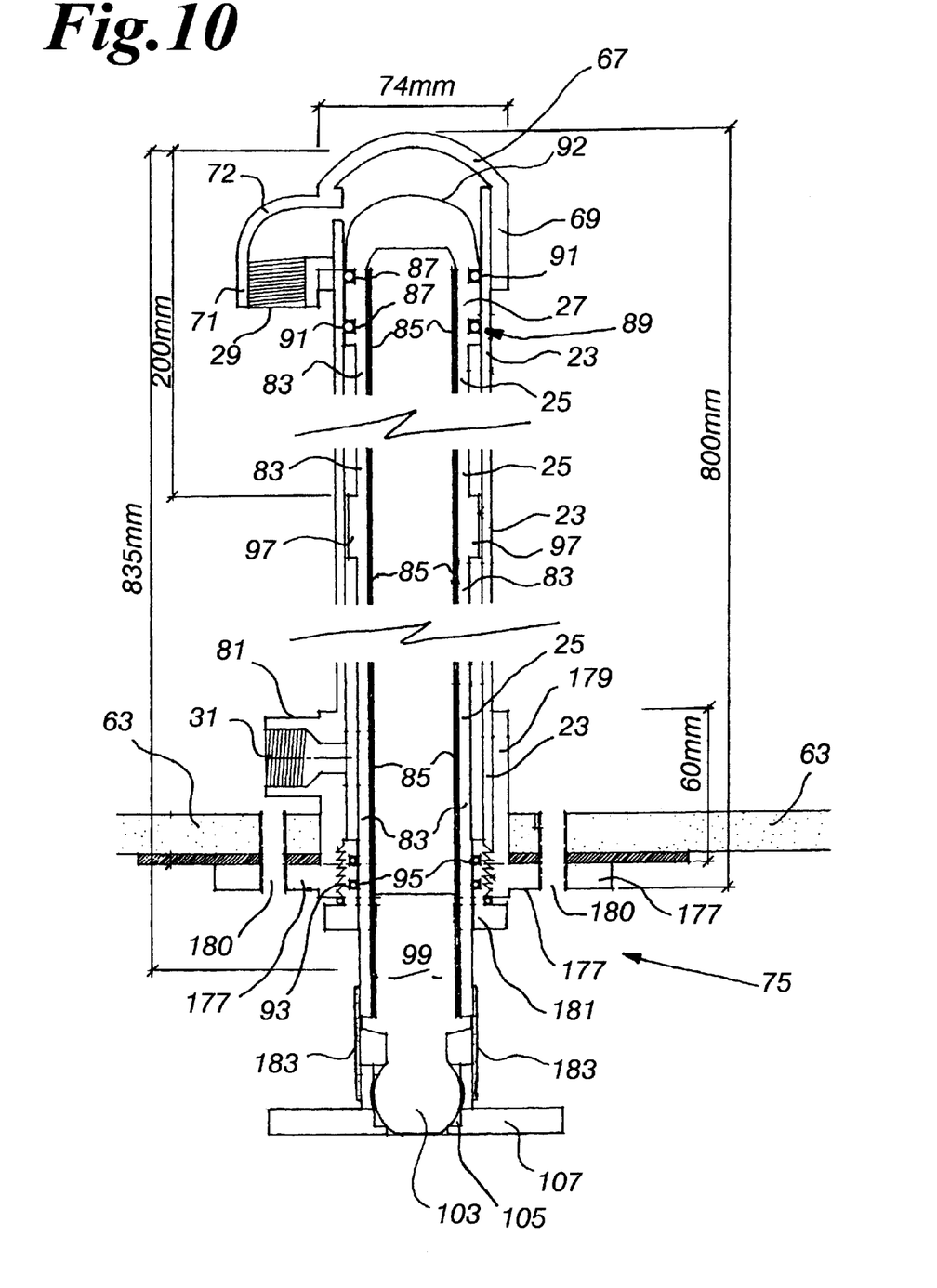
FIG. 10 is a cut-away view of a water actuated ram utilized in the third embodiment.
Figure 11:
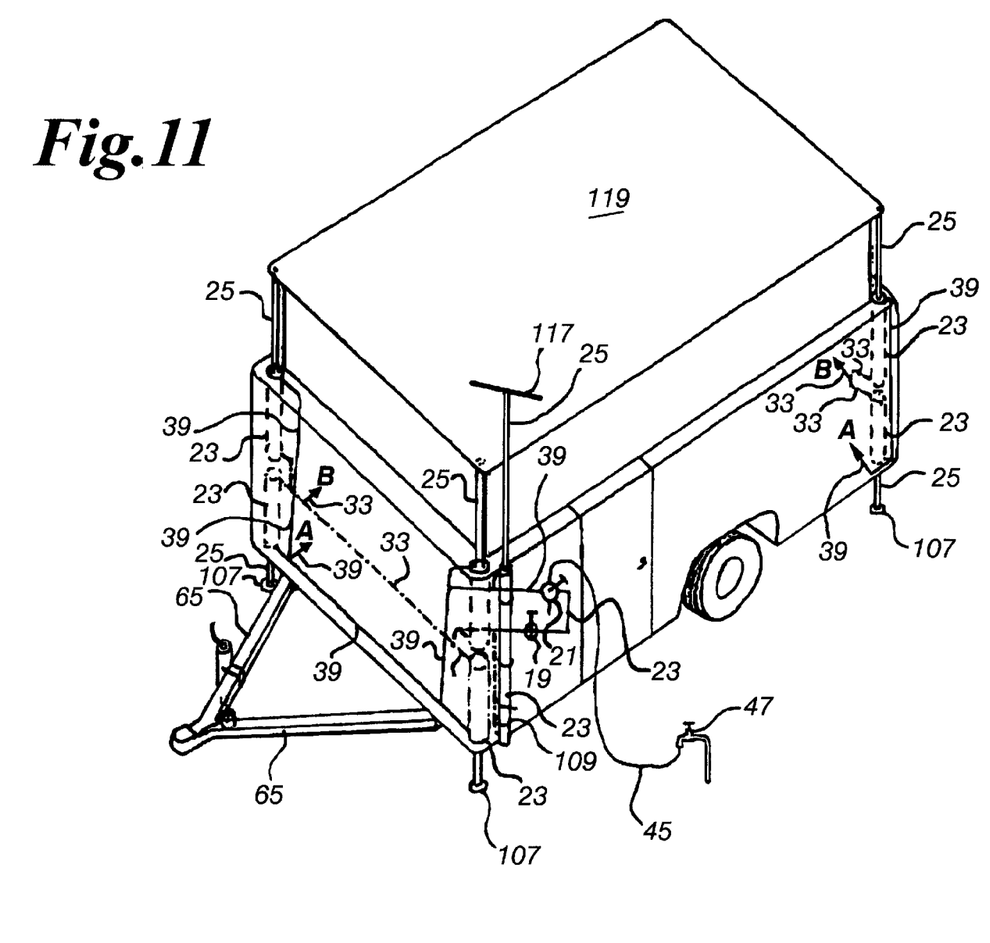
FIG. 11 is an isometric view of an assembled caravan.

The embodiments shown in FIGS. 1 to 8 inclusive, and in FIG. 10, are a stabilizing system for a caravan, intended to replace the "wind-down" or screw down pivoted leg attachments which are commonly used to stabilize a caravan when parked in a caravan park or camping ground or other camping area.

Figure 4:
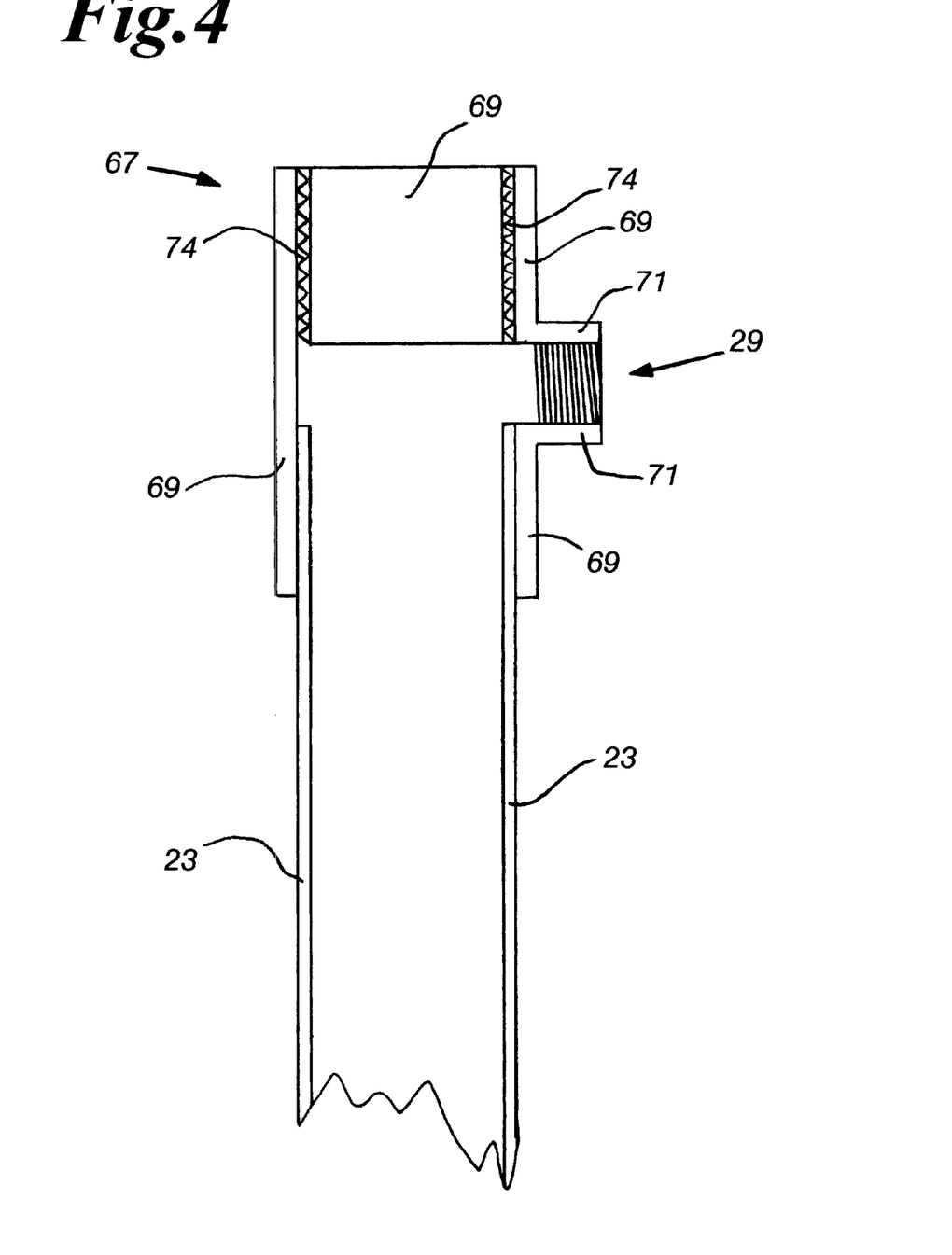
FIG. 4 is a cut-away view of the upper part of one of the water actuated ram utilized in the embodiment.
Figure 5:
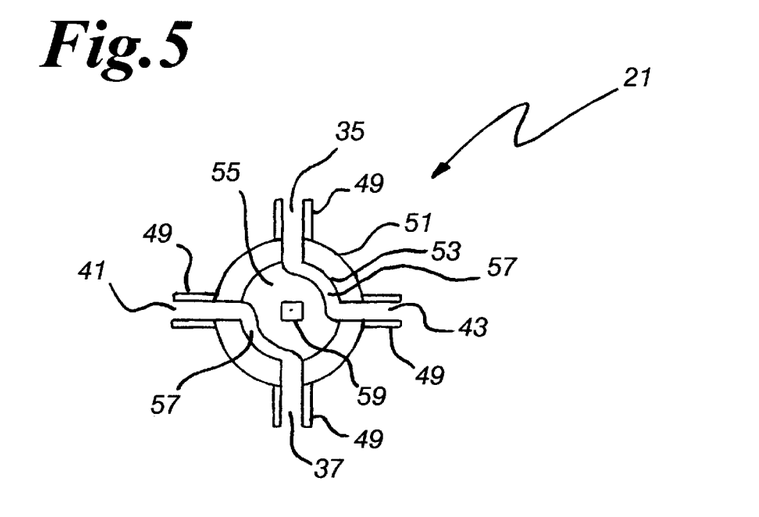
FIG. 5 is a plan view of a selector valve utilized in both of the embodiments.
Figure 6:
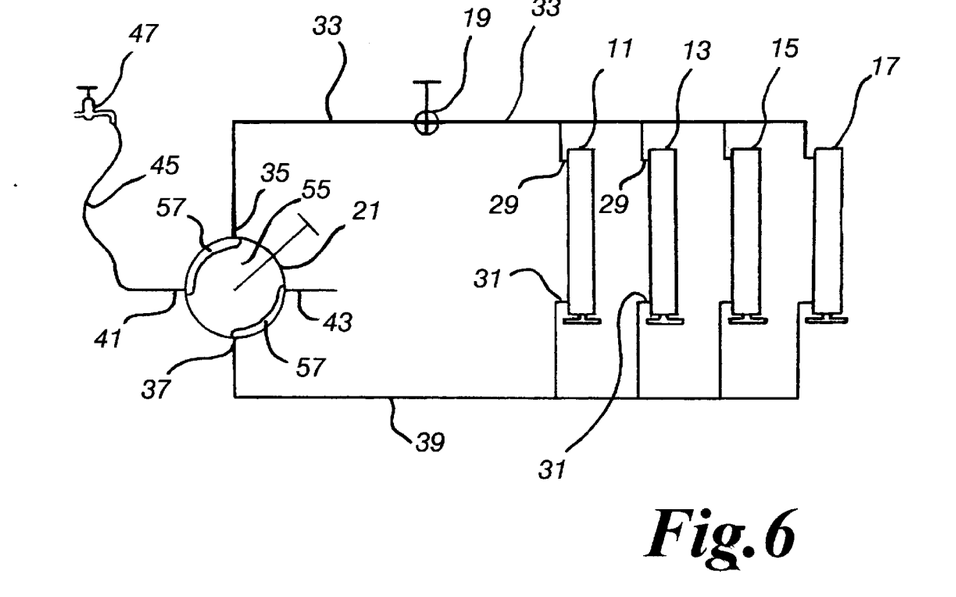
FIG. 6 is a schematic of the stabilizing system of the first embodiment.

The stabilizing system for a caravan, according to the first embodiment, is illustrated in FIGS. 1 to 7 inclusive. Referring to FIG. 6, the schematic of the stabilizing system is shown. The stabilizing system comprises four water actuated rams 11, 13, 15, and 17, valve means in the form of a shutoff valve 19, and selector valve 21. Referring to FIGS. 2a and 2b, the water actuated rams each have a body 23 which telescopingly receives a leg 25 therewithin. The leg 25 is connected integrally with a piston 27 which seals the region thereabove within the body 23 from the region therebelow, in a manner which will be understood from the following description.

The water actuated rams 11, 13, 15, 17, each have two communication ports, namely a first port in the form of an upper port 29 and a second port in the form of a lower port 31. The upper port 29 communicates with the region within the body 23, above the piston 27, while the lower port 31 communicates with region within the body 23 below the piston 27. The body 23, leg 25, piston 27, upper port 29 and lower port 31 can best be seen in FIGS. 1 and 2a.

Referring back to FIG. 6, the water actuated rams 11, 13, 15, and 17, are connected in parallel, their upper ports 29 being fluidly connected, and their lower ports 31 being fluidly connected together.

The parallel arrangement of the water actuated rams 11, 13, 15, 17 is connected in series with the shutoff valve 19. The shutoff valve 19 is located in a connecting hose 33 which connects the upper ports 29 to a first transfer port 35 of the selector valve 21. The lower ports 31 of the water actuated rams 11, 13, 15, and 17, are connected to a second transfer port 37 of the selector valve 21, also by a connecting hose 39.

The other ports of the selector valve 2 comprise an inlet 41 and an exhaust or drain 43. The inlet 41 is connected to a length of flexible hose 45, which has a fitting to allow it to be connected to a water supply tap 47 provided in a camping ground. Alternatively, the inlet can be plumbed to the main water supply of the caravan, which is in turn connected to the water supply tap provided in a camping ground. As a further alternative, it will be appreciated that where a water supply tap 47 is not provided by a camping ground proprietor or the like, that the flexible hose 45 may be connected to an electric or hand operated water pump which is plumbed into the caravan water tank. It will of course be appreciated that in either of the two alternatives, the flexible hose 45 may be replaced with the appropriate rigid pipework which connects to the pump. It will also be understood that where the system is to be used in ambient temperatures below the freezing point of water, a closed circuit water supply incorporating antifreeze will be necessary. In such circumstances, clearly the water supply and pump arrangement would be isolated from the water supply of the caravan.

Referring to FIG. 5, the selector valve 21 is illustrated in greater detail. The ports 35, 37, 41, and 43 are provided by tubular fittings 49 which communicate through the wall of a body 51 having a spherical inner surface 53, the body 51 being closed at the top and bottom thereof (not shown). Located within the body 51 for rotation, and located snugly and in a sealingly manner against the cylindrical inner surface 53, is a spherical inner body 55. The spherical inner body 55 has two channels 57, which depending upon the positioning of the spherical inner body 55, allow any two adjacent ports 35, 37, 41, or 43 in opposition to each other to communicate. The two channels may need to include peripheral embedded teflon or o-ring type seals in order to prevent leakage of water.

The spherical inner body 55 has an aperture 59 of square cross-section through which a shaft (not shown) may be received, which can be operated by a lever, to select the relative rotational position of the spherical inner body 55 within the body 51, and hence the ports which are in fluid communication with each other.

Referring to FIG. 6, the selector valve 21 is shown with the spherical inner body 55 in a position such that the inlet 41 communicates with the first transfer port 35, to supply water from the water supply tap 47 to the upper ports 29 of the water actuated rams. In FIG. 6, the selector valve 21 allows water to communicate from the lower ports 31 of the water actuated rams to the drain 43, via the second transfer port 37. In the position of the spherical inner body 55 within the body 51, shown in FIG. 5, the inlet 41 communicates with the second transfer port, to supply water from the water supply tap 47 to the lower ports 31, while the upper ports 29 would communicate with the drain 43 via the first transfer port 35. Water from the drain may be either collected for re-use or disposed of.

Figure 7:
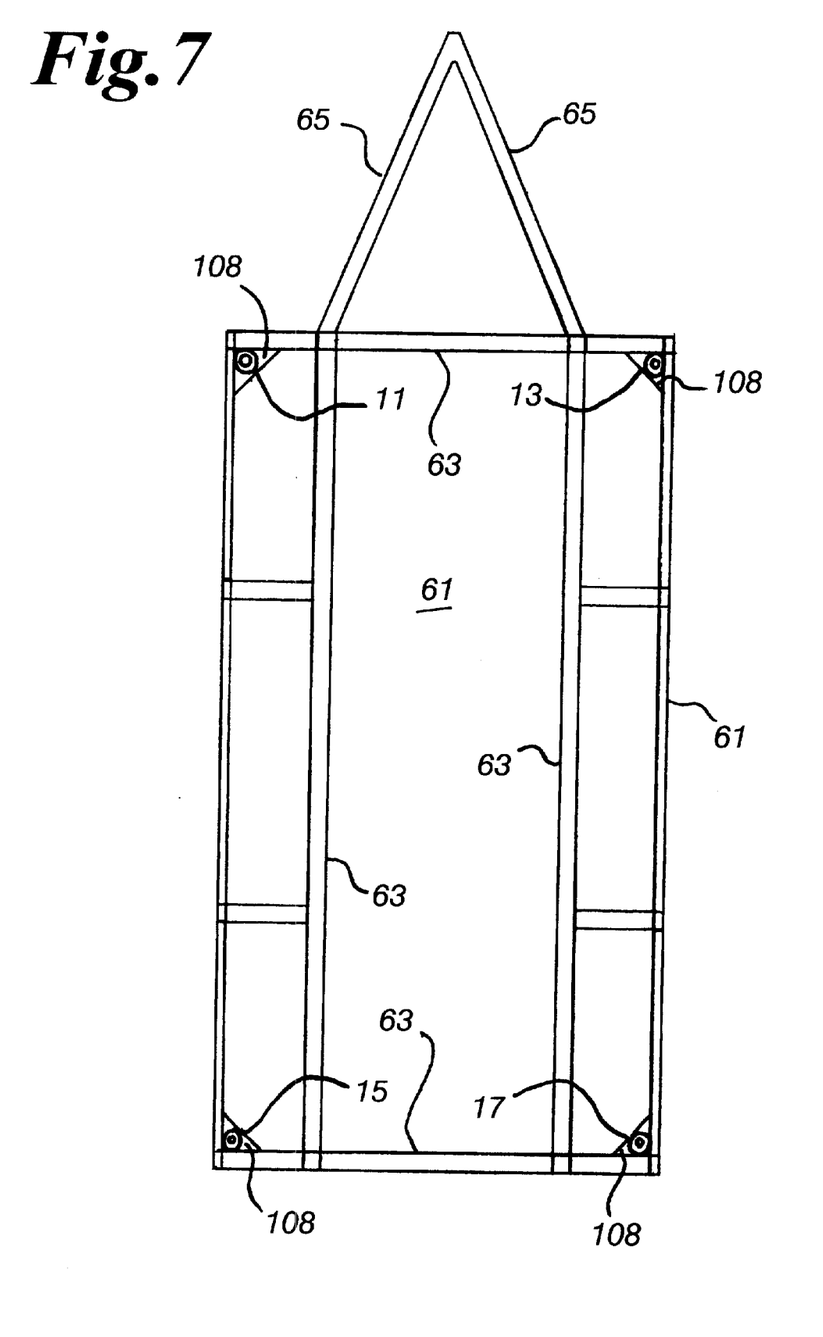

Referring to FIG. 7, the plan view of the caravan chassis is shown, with the floor pan 61 resting on chassis rails 63, which in turn is connected to a triangular draw bar member 65, at the forward end of the caravan. The location positions of the water actuated rams 11, 13, 15, and 17 are indicated. The rams are located internally so as to not be visible, and might be located for example so as to be accessible from internal cupboards or other spaces within the caravan.

Referring to FIG. 7, the plan view of the caravan chassis is shown, with the floor pan 61 resting on chassis rails 63, which in turn is connected to a triangular draw bar member 65, at the forward end of the caravan. The location positions of the water actuated rams 11, 13, 15, and 17 are indicated. The rams are located internally so as to not be visible, and might be located for example so as to be accessible from internal cupboards or other spaces within the caravan.

Figure 3:
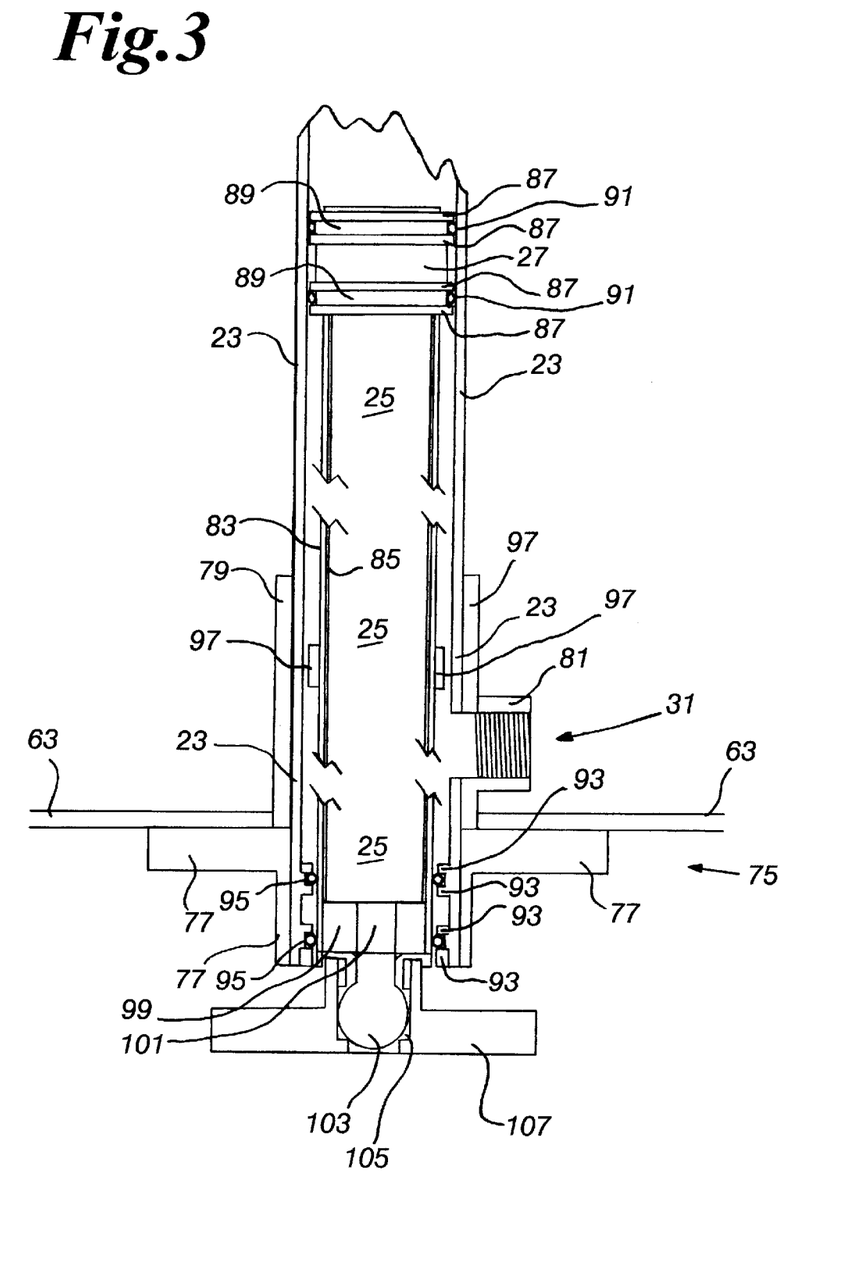
FIG. 3 is a cut-away view of the lower part of one of the water actuated ram utilized in the first embodiment.

Referring to FIGS. 3 and 4, a water actuated ram is shown in greater detail. The body 23 of the water actuated ram is formed from 48 mm outside diameter P.V.C. pipe having a wall thickness of 3 mm. The top 67 has a sleeve portion 69 fitted over the body 23 and welded thereto. A ½ inch BSP pipe-fitting 71 is welded to sleeve 69, to form the upper port 29. The body 23 is drilled through at the location of the pipe-fitting 71 to allow fluids to communicate with the inside of the body 23 via the upper port 29. The top 67 of the body 23 is closed off by a plug 73 which is fitted to the sleeve 69 by screw threaded fitting 74, and sealed with teflon thread seal tape to prevent loss of water through leakage. A tapered thread on the plug 73 is preferred. The plug should have a square section or in-hex recess for purchase by a tool, for removal to allow servicing.

Referring to FIG. 3, at the bottom 75 of the body 23 is located a flange member 77, welded to the body 23. The flange member 77 provides a base for the water actuated ram, for securing against and to the chassis member 63 of the caravan. Immediately above the flange 77 is a further sleeve 79 which is also welded to the body 23. Located in the sleeve 79 and communicating through the wall of the body 23 is a ½ inch BSP pipefitting 81 which provides the lower port 31 for communicating water to the inside of the body 23.

The leg 25 is formed by a composite tube comprising 34mm outside diameter pvc pipe 83 formed over 29 mm outside diameter aluminum tube 85 having a 1.5 mm wall thickness. The aluminum tube 85 provides structural rigidity against the pvc pipe 83 fracturing due to sideways forces which may be imparted.

At the top of the leg 25 is located the piston 27 which is fitted over the pvc pipe 83 and welded thereto. The piston is formed of a pvc sleeve which has two pairs of annular steps 87 forming an annular groove 89 therebetween, and each of which is positioned an o-ring 91. The o-rings provide a seal between the piston and the internal wall of the body 23, so that water introduced under pressure through either the upper port 29 or the lower port 31 will cause the piston 27 to move, and will not escape past the o-rings.

At the bottom of the body 23, are located two pairs of internal annular steps 93, each pair defining a groove therebetween which houses an o-ring 95 which seals against the leg 25, preventing loss of water from inside the body 23.

Welded on the leg 25 at a position located one quarter along the length of the leg from the piston, is an annular collar 97. The annular collar 97 provides a stop, which when contacting against the uppermost internal annular step 93, prevents more than three quarters of the leg 25 from extending beyond the body 23. This prevents excessive turning movement by movement of the caravan being imparted over too short a length of the body 23 which might result in damage to the water actuated rams.

At the bottom of the leg 25 is a pvc plug 99, welded thereto. Extending through the pvc plug 99 and engaging therewith in threaded manner is a bolt 101 which is formed integrally with a pvc ball 103 forming a ball and socket joint, the socket 105 being provided in the central part of a footing 107. This allows the footing to rest on uneven ground with even distribution of weight. Fitting the bolt 101 by screw thread, allows removal, so that the piston 27 can be removed for servicing (replacement of o-rings 91, 95) if necessary.

Figure 1:
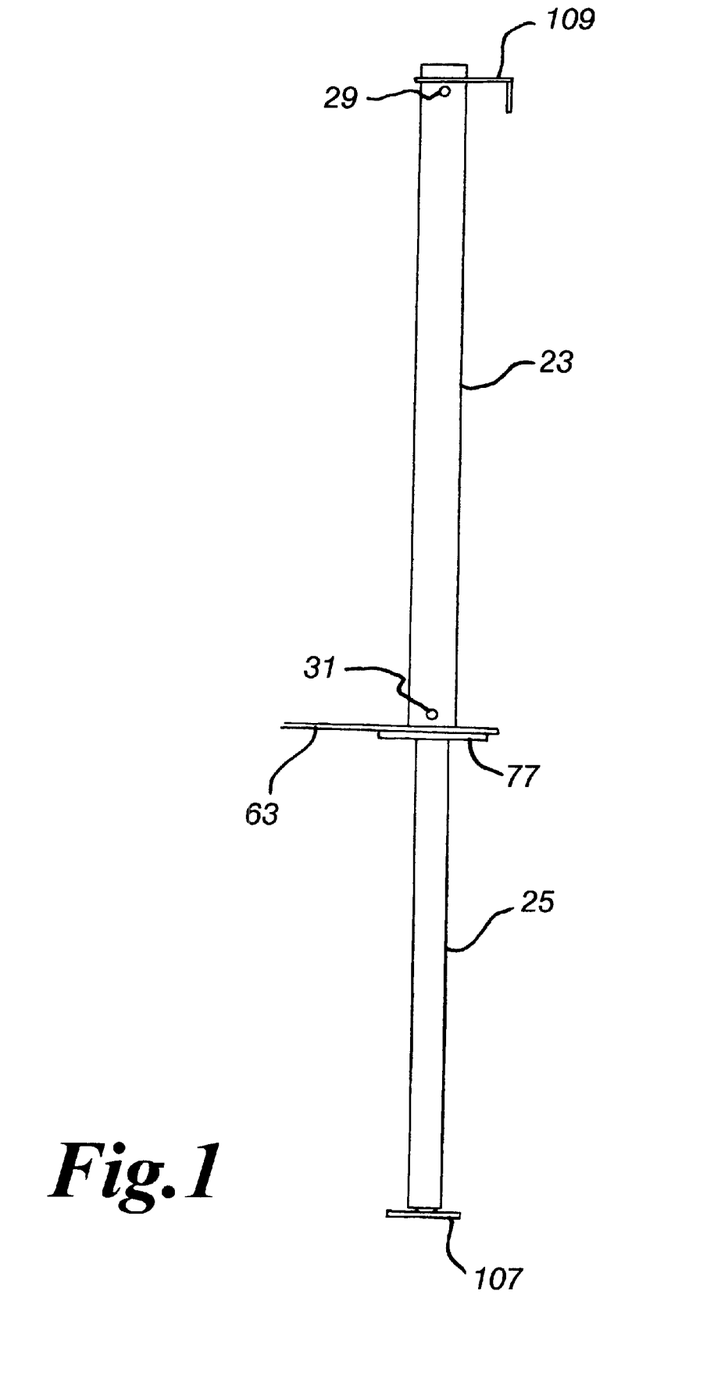
FIG. 1 is a side view of a water actuated ram utilized in the first embodiment.
Figures 2A, 2B:
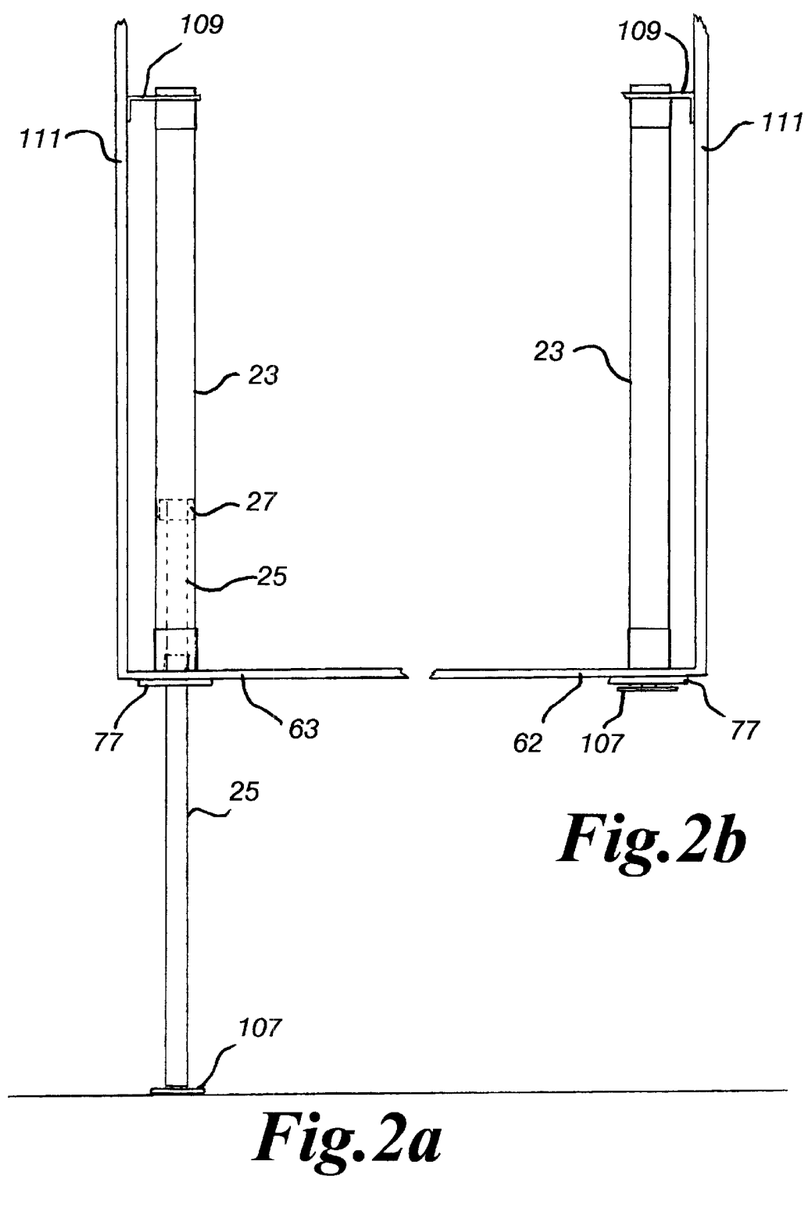
FIG. 2a is a side view of one of the water actuated rams utilized in first the embodiment, shown in the extended condition.
FIG. 2b is a side view of one of the water actuated rams utilized in the first embodiment, shown in the retracted condition.

As shown in FIG. 7, the water actuated rams are secured next to the chassis 63, on plates 108 welded to the chassis 63. The tops 67 of the water actuated rams are secured by brackets 109 to structural wall members 111 of the caravan, as shown in FIGS. 2a and 2b. In use, the water actuated rams will be stowed in the upward position as shown in FIG. 2b. On arrival at a camping ground, the caravan is parked, and the flexible hose 45 is connected to a water supply tap 47 of the camping ground. The selector valve 21 is set to the position shown in FIG. 6, and the shutoff valve 19 is opened, so that when the water supply tap 47 is opened, water will cause the pistons 27 in each of the water actuated rams to be displaced downwardly, forcing the legs 25 down, until the footings reach the ground. Since it is not an object to lift the caravan off the ground, using the water actuated rams, very little pressure is actually required in practice, in order to extend the legs downward to the required position. Once the required position is reached, the shutoff valve 19 can be closed, thereby acting as a lock to prevent loss of water from within the water actuated rams, thereby preventing weight placed on the water actuated rams from within the caravan from displacing the legs 25 within the bodies 23.

When it is desired to move the caravan, the selector valve 21 is set to the position shown in FIG. 5, the shutoff valve 19 is opened, and the water supply tap 47 is operated, whereupon water will flow into the lower ports 31 of the water actuated rams, forcing the piston upwards, and causing the legs 25 to retract within the bodies 23 of the water actuated rams.

Figure 8A:
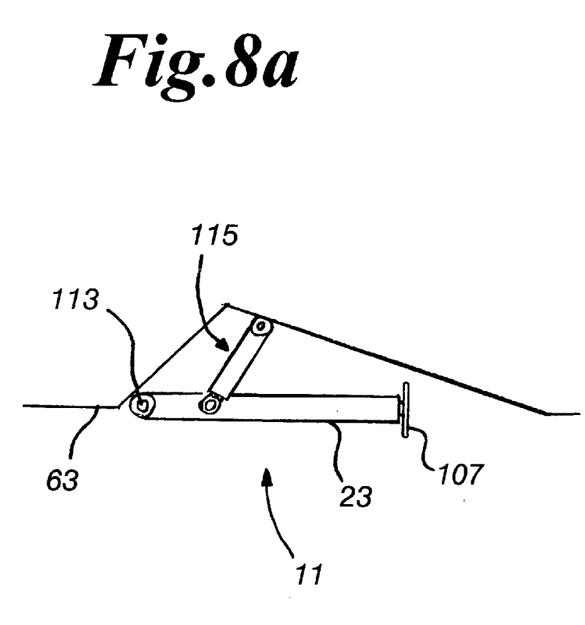
FIG. 8a is a side view showing part of the particulars of the a stabilizing system according to a second embodiment, shown in a retracted condition.
Figure 8B:
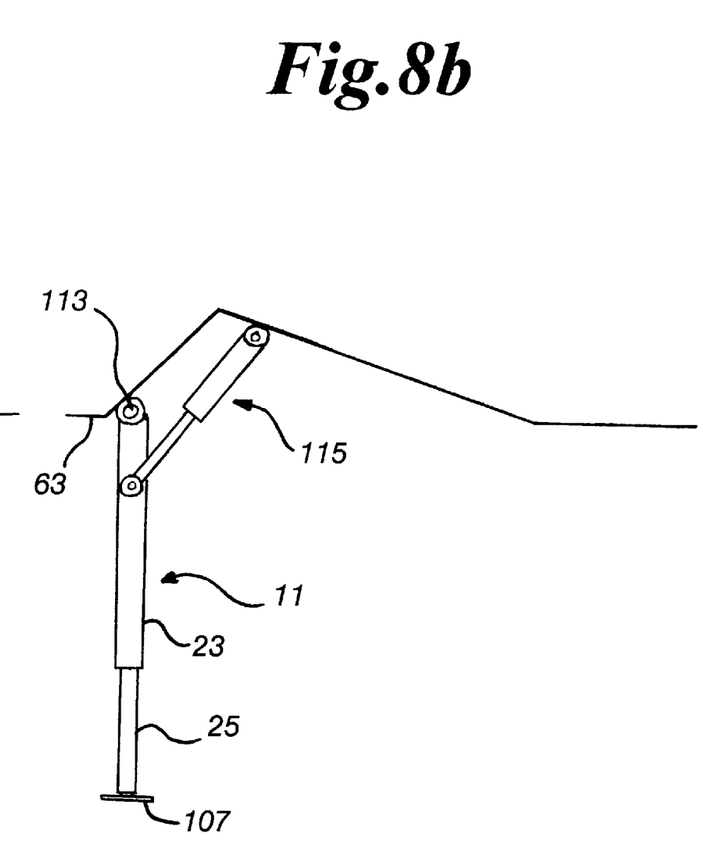
FIG. 8b is a side view showing part of the particulars of the a stabilizing system according to the second embodiment, shown in an extended condition.

Referring now to FIGS. 8a and 8b, the second embodiment is shown. This embodiment differs from the first insofar as that the water actuated rams are connected to the caravan chassis 63 about a pivot point 113 for movement from a horizontal position as shown in FIG. 8a to a vertical position as shown in FIG. 8b by actuation of a further water actuated ram 115. Once actuated into the vertical position, the water actuated ram 11 may be operated to extend the leg 25 from the body 23. The further water actuated rams 115 work on a similar principle to the primary water actuated rams 11, 13, 15, and 17, except that they need not be as robust as the main water actuated rams and therefore may be smaller in size.

Figure 9A:
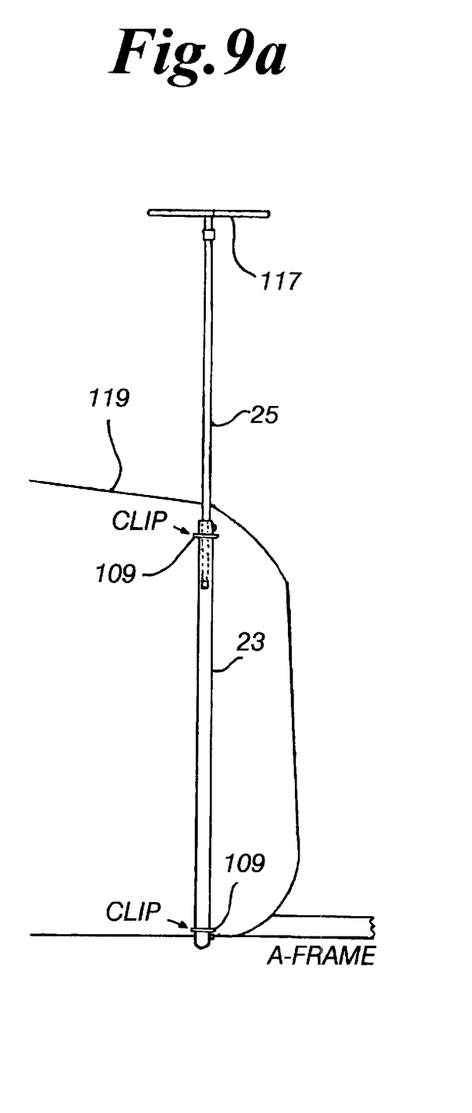
FIGS. 9a and 9b are side views showing an alternative usage for the water actuated rams utilized in the embodiments.
Figure 9B:
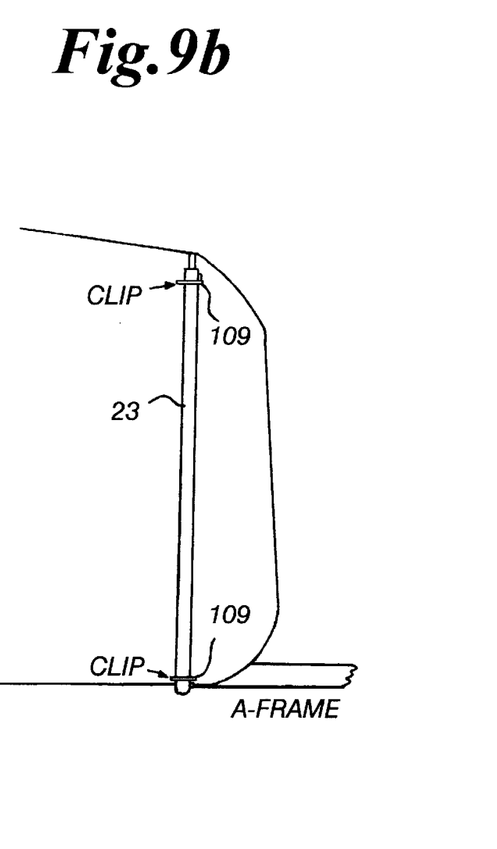

Referring to FIGS. 9a and 9b, a further application for the water actuated ram 11 is shown. This ram is configured to be of axial dimensions somewhat larger than the other hydraulic rams, its purpose being to elevate a television aerial 117 to a height above the roof 119 of the caravan. This ram can be connected in parallel with the other rams so that its actuation takes place simultaneously therewith.

Referring to FIG. 10, a water actuated ram according to the third and most preferred embodiment, is shown in detail. This water actuated ram is intended to substitute for the water actuated ram of the first embodiment, and differs from the first embodiment in that access for servicing (ie replacement of o-rings) is from underneath. This means that the water actuated ram may be installed in the caravan, and does not require access from within the caravan body for any normal servicing operations that might be required. It should be noted that while some dimensions are given here and shown in the drawings, this is for guidance only, and the figures may be varied depending upon the application.

In this description, like numbers indicate like parts in common with the water actuated ram of the first embodiment. The body 23 of the water actuated ram is formed from 61 mm outside diameter A.B.S. (acrylonitrile butadiene styrene) pipe having a wall thickness of 3.8 mm. The top 67 has a sleeve portion 69 fitted over the body 23 and welded thereto. A ½ inch BSP pipe-fitting 71 is welded to the sleeve 69 via an elbow 72, to form the upper port 29. The body 23 is drilled through at the joining location of the elbow 72 to allow fluids to communicate with the inside of the body 23 via the upper port 29.

At the bottom 75 of the body 23 is located a flange member 177, welded to a further sleeve 179 which is in turn welded to the body 23. The flange member 177 provides a base for the water actuated ram, for securing against and to the chassis member 63 of the caravan. Apertures 180 are provided for bolts to secure the flange member 177 to the chassis member 63.

Located in the sleeve 179 and communicating through the wall of the body 23 is a ½ inch BSP pipefitting 81 which provides the lower port 31 for communicating water to the inside of the body 23.

The leg 25 is formed by a composite tube comprising 42.5 mm outside diameter A.B.S. pipe 83 with 4.5 mm wall thickness, formed over 33.5 mm outside diameter aluminum tube 85 having a 1.6 mm wall thickness. The aluminum tube 85 provides structural rigidity against the A.B.S. pipe 83 fracturing due to sideways forces which may be imparted.

At the top of the leg 25 is located the piston 27 which is fitted over the A.B.S. pipe 83 and welded thereto. The piston is formed of a A.B.S. sleeve which has two pairs of annular steps 87 forming an annular groove 89 therebetween, in each of which is positioned an o-ring 91. The o-rings provide a seal between the piston and the internal wall of the body 23, so that water introduced under pressure through either the upper port 29 or the lower port 31 will cause the piston 27 to move, and will not escape past the o-rings. Located above the piston 27 is a raised portion 92 which forms a stop in conjunction with the top 67 of the sleeve, limiting upward movement of the piston 27. The internal shape of the top 67 and the external shape of the raised portion closely correspond, to minimize the amount of air that might be trapped in the water actuated ram, which could lead to sponginess due to the air being compressible.

At the bottom of the body 23, are located in the internal periphery of a threaded annular bush 181 (in effect a bolt with a central bore hole therethrough) are two pairs of internal annular steps 93, each pair defining a groove therebetween which houses an o-ring 95 which seals against the leg 25, preventing loss of water from inside the body 23.

Welded on the leg 25 at a position located approximately one quarter along the length of the leg from the piston, is an annular collar 97. The annular collar 97 provides a stop, which when contacting against the uppermost extent of the annular bush 181, prevents more than three quarters of the leg 25 from extending beyond the body 23. This prevents excessive turning moment by movement of the caravan being imparted over too short a length of the body 23 which might result in damage to the water actuated rams. The threaded annular bush 181 is received in a threaded portion in the sleeve 179.

At the bottom of the leg 25 is a pvc plug 99, press fitted thereto. The pvc plug is formed integrally with a ball 103 forming a ball and socket joint, the socket 105 being provided in the central part of a footing 107. This allows the footing to rest on uneven ground with even distribution of weight. A shroud 183 formed of flexible rubber sleeve or other flexible material connects between the bottom of the leg 25 and the external surface of the socket 105, to prevent dust and debris getting into the ball and socket joint.

For servicing of the O-rings in a water actuated ram, the annular bush 181 is unscrewed from the sleeve 179, and the assembly of leg 25, piston 27, and footing 107 is withdrawn from the body 23.

The systems of the three embodiments can also be adapted (by inverting them) to raise and lower the roof of a pop-top style caravan. In fact the stabilizing system of any of the three embodiments can be installed in conjunction with (and in parallel with) a system for raising and lowering the roof of a pop-top caravan (and also with the system for raising and lowering a television antenna), with all water actuated rams connected in parallel so that they operate in unison, and a common shut-off valve, and a common selector valve if used.

In the case of a system for raising and lowering the roof of a pop-top caravan, two arrangements are contemplated. The first arrangement would be with the water actuated rams provided to do all of the work in raising and lowering the pop-top, in which case the throw of the rams would be ideally the extent of displacement of the pop-top. The second arrangement would be with the water actuated rams arranged with a shorter throw than the displacement of the pop-top, so that the water actuated rams provide the initial lift (which is often the most difficult requiring the most exertion, with gas struts or some other mechanism as used in a conventional systems being operable for the remainder of the raising of the pop-top. The second arrangement would be used in a situation where space did not permit installation of an otherwise longer water actuated ram which would be required for an arrangement of the first type. Where the second arrangement was installed, it would probably not be necessary to connect the legs of the rams to the pop-top roof, since the legs of the pistons would need merely to abut an appropriate surface in order to urge the pop-top roof upwardly.

The invention provides a system which is less expensive than using conventional hydraulics, and in many if not most applications, obviates the need to include a pump, further lessening the expense of the stabilizer system.

It should be appreciated that the scope of the invention is not limited to the particular embodiment disclosed herein. It will be appreciated that changes may be made without departing from the spirit and scope of the invention. While parts of the embodiment have been described as being made from PVC (polyvinyl chloride) or ABS (acrylonitrile butadiene styrene), other plastics such as polypropylene would be equally suitable. While metal parts could be used, these would add to the cost of a system according to the invention, and would suffer from corrosion especially given the variability of water supplies that might be available to a user. It will also be understood that variations may be made from dimensions given in the embodiment, such as wall thicknesses, and ram cross-sectional areas, depending upon the weight of a particular caravan that the system might be utilized in. It will be further understood that while the embodiment is directed toward a system for a caravan, it may be equally suitable for use in any other type of trailer, such as a mobile food stall or a horse float.

What is claimed is:

1. A stabilizing system for a trailer when parked, the stabilizing system including at least two water actuated rams located in spaced relation near the periphery of the floor pan of the trailer, each said water actuated rams having a body containing a piston, the body having first and second communication ports for communicating flow of water to and/or from said body, said piston having sealing means to form a seal between said piston and said body, said sealing means being located between said first and second ports to prevent free flow of water between said first and second ports, each said piston being connected by a leg to a footing for bearing against the ground, and wherein further sealing means is included in each said water actuated ram between said leg and said body to prevent leakage of water from said body past said leg; said water actuated rams being fluidly connected together in parallel, and said stabilizing system having a shut-off valve associated with the water actuated rams to selectively shut-off water flow to lock said water actuated rams, wherein said system includes a water inlet fluidly communicating with a selector valve, said selector valve selectively fluidly communicating via said shutoff valve with said first ports or said second ports, wherein said selector valve in a first position permits flow of water from said water inlet to said first ports to force said legs outward until said footings bear against the ground, and in a second position permits flow of water from said water inlet to said second ports to retract said legs, said selector valve having a drain to drain water from said second port in said first position, and drain water from said first port in said second position; said piston, said leg, and said body being characterized by plastic construction of water contacting parts to obviate corrosion from water.

2. A system as claimed in claim 1 wherein said inlet includes a fitting to connect to a faucet.

3. A system as claimed in claim 1 wherein also including a further water actuated ram to raise and lower an antenna, said further water actuated ram having a body containing a piston, the body having first and second communication ports for communicating flow of water to and/or from said body, said piston having sealing means to form a seal between said piston and said body, said sealing means being located between said first and second ports to prevent free flow of water between said first and second ports, said piston being connected by an upwardly inclined leg to said antenna, and wherein further sealing means is included in said further water actuated ram between said leg and said body to prevent leakage of water from said body past said leg; said further water actuated ram being fluidly connected in parallel with said water actuated rams of said system, and said shut-off valve means also selectively shutting-off water flow to lock said further water actuated ram, wherein said selector valve in said first position permits flow of water from said water inlet to said first port of said further water actuated ram to force said leg upward to raise said antenna, and in said second position permits flow of water from said water inlet to said second port to retract said leg to lower said antenna; said piston, said leg, and said body of said further water actuated ram being characterized by plastic construction of water contacting parts to obviate corrosion from water.

4. A combined stabilizing system and roof-raising system for a pop-top trailer when parked, the stabilizing system including at least two water actuated rams located in spaced relation near the periphery of the floor pan of the trailer, the roof-raising system including at least two additional water actuated rams located in spaced relation near the periphery of and connected to the roof of the trailer; each said water actuated ram having a body containing a piston, the body having first and second communication ports for communicating flow of water to and/or from said body, said piston having sealing means to form a seal between said piston and said body, said sealing means being located between said first and second ports to prevent free flow of water between said first and second ports; in said stabilizing system, each said piston being connected by a leg to a footing for bearing against the ground, and in said roof-raising system and in said roof-raising system each said body being secured to said pop-top trailer and each said piston being connected by a leg to said roof; wherein further sealing means is included in each said water actuated ram between said leg and said body to prevent leakage of water from said body past said leg; said water actuated rams being fluidly connected together in parallel, and said combined stabilizing system and roof-raising system having a shut-off valve associated with the water actuated rams to selectively shut-off water flow to lock said water actuated rams, wherein said combined stabilizing system and roof-raising system includes a water inlet fluidly communicating with a selector valve, said selector valve selectively fluidly communicating via said shut-off valve with said first ports or said second ports, wherein said selector valve in a first position permits flow of water from said water inlet to said first ports to force said legs outward until said footings bear against the ground and until said roof is raised, and in a second position permits flow of water from said water inlet to said second ports to retract said legs and lower said roof, said selector valve having a drain to drain water from said second port in said first position, and drain water from said first port in said second position; said piston, said leg, and said body being characterized by plastic construction of water contacting parts to obviate corrosion from water.

5. A combined stabilizing system and roof-raising system as claimed in claim 4 said stabilizing system including four of said water actuated rams, one located near each corner of the floor plan of the trailer, and said roof-raising system including four of said water actuated rams.

6. A combined stabilizing system and roof-raising system as claimed in claim 4 in said inlet includes a fitting to connect to a faucet.

7. A combined stabilizing system and roof-raising system as claimed in claim 4 wherein also including a further water actuated ram to raise and lower an antenna, said further water actuated ram having a body containing a piston, the body having first and second communication ports for communicating flow of water to and/or from said body, said piston having sealing means to form a seal between said piston and said body, said sealing means being located between said first and second ports to prevent free flow of water between said first and second ports, said piston being connected by an upwardly inclined leg to said antenna, and wherein further sealing means is included in said further water actuated ram between said leg and said body to prevent leakage of water from said body past said leg; said further water actuated ram being fluidly connected in parallel with said water actuated rams of said system, and said shut-off valve means also selectively shutting-off water flow to lock said further water actuated ram, wherein said selector valve in said first position permits flow of water from said water inlet to said first port of said further water actuated ram to force said leg upward to raise said antenna, and in said second position permits flow of water from said water inlet to said second port to retract said leg to lower said antenna; said piston, said leg, and said body of said further water actuated ram being characterized by plastic construction of water contacting parts to obviate corrosion from water.

* * * * *